United States Patent
Sirois et al.

(10) Patent No.: US 6,847,285 B2
(45) Date of Patent: Jan. 25, 2005

(54) INTERLOCK TABS FOR LAMINATIONS

(75) Inventors: Robert Sirois, Fort Wayne, IN (US); James J. Holich, Fort Wayne, IN (US); Dennis P. Bobay, Ossian, IN (US); Robert K. Hollenbeck, Fort Wayne, IN (US); Jeffrey A. Hall, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 23 days.

(21) Appl. No.: 09/682,277

(22) Filed: Aug. 13, 2001

(65) Prior Publication Data

US 2003/0030535 A1 Feb. 13, 2003

(51) Int. Cl.[7] ............................................... H01F 27/24
(52) U.S. Cl. ....................... 336/234; 336/210; 310/216
(58) Field of Search ......................... 336/210, 216–217, 336/233, 234; 310/216–217

(56) References Cited

U.S. PATENT DOCUMENTS

| 4,024,486 | A | * | 5/1977 | Klappert | 336/210 |
|---|---|---|---|---|---|
| 4,542,313 | A | * | 9/1985 | Di Pietro | 310/65 |
| 4,586,236 | A | | 5/1986 | Jones | |
| 4,728,842 | A | | 3/1988 | Martin | |
| 4,900,636 | A | | 2/1990 | Takenouchi et al. | |
| RE34,667 | E | | 7/1994 | Neumann | |
| 5,333,525 | A | | 8/1994 | Schlegel | |
| 5,649,349 | A | * | 7/1997 | Greenway | 29/598 |
| 5,894,182 | A | | 4/1999 | Saban et al. | |
| 6,002,191 | A | * | 12/1999 | Saban | 310/216 |
| 6,018,207 | A | * | 1/2000 | Saban et al. | 310/217 |
| 6,223,417 | B1 | | 5/2001 | Saban et al. | |
| 6,237,214 | B1 | | 5/2001 | Neuenschwander | |
| 6,722,015 | B2 | * | 4/2004 | Sirois et al. | 29/596 |

* cited by examiner

Primary Examiner—Tuyen T. Nguyen
(74) Attorney, Agent, or Firm—Carr LLP

(57) ABSTRACT

A laminated plate assembly in which the laminations in a stack are secured together by means of one or more interlocks or tabs that project from the uppermost lamination in the assembly through holes or slots in all the other laminations in the assembly, or around the periphery of the other laminations in the assembly, with each tab being bent or pressed against the underside of the bottom lamination in the assembly. This secures all the laminations in the stack together, much like a staple secures papers in a stack together, allowing for additional handling and processing of the laminated plate assembly without concern that the laminated plates in the stack will become misaligned or even become removed from the stack.

10 Claims, 6 Drawing Sheets

INTERLOCK TABS FOR LAMINATIONS

BACKGROUND OF INVENTION

This invention relates generally to interlocking laminations used in electrical devices, such as those used in the windings for D.C. motor armatures or A.C. rotors and stators.

Typically, laminations are stacked, or piled together to achieve a required thickness of laminations. Because the laminations undergo further processing, such as being wound to form a motor core, it is desirable to retain the laminations together in a stack of a desired height so that the stack of laminations can be moved together to a subsequent manufacturing process.

Various methods and apparatuses have been used to fasten laminations together, including the use of tabs in the laminations which extend below the lower surface of the lamination and are inserted into a slot formed in a next adjacent lamination. Typically, the lowest lamination in the stack has the interlock tabs removed because there is no need to secure the lowest lamination in the stack to anything else.

A drawback with the foregoing method of securing laminations together is that sometimes, in the course of further processing of the laminations, a lamination may come out of the slot on the next lower lamination. When this happens, the integrity of the stack is lost, and production must be stopped to realign the stack, or the part must be rejected. In one attempt to resolve this drawback, a wrapper of some sort is placed around the stack of laminations, but because the stack of laminations undergoes further processing, such as winding, such a wrapper may interfere with the additional processing. Also, because these stacks of laminations are used in electrical equipment, care must be taken that the material of any such wrapper does not interfere with the electrical and magnetic properties of the laminations.

Accordingly, a continuing search has been directed to the development of a system and method by which laminations in a stack may be more securely interlocked to each other without decreasing the throughput of lamination stacks, and without affecting the electrical and magnetic properties of the resultant stack of laminations.

SUMMARY OF INVENTION

Accordingly, the system of the present invention provides for interlocking the upper lamination in a stack to the lowest lamination in the stack such that a tab of the upper lamination is inserted in an opening in the lower lamination(s) and then bent so that it is locked against the underside of the lowest lamination in the stack, securing all the laminations in the stack together. This interlocking is performed as part of the process of manufacturing the lamination, eliminating the need for additional tooling.

One aspect of the present invention is a laminated plate assembly that comprises a first lamination that defines at least one hole. A second lamination that defines at least one hole corresponding in number and position to the hole(s) of the first lamination is positioned adjacent to the first lamination. At least one interlocking tab extends from each hole in the second lamination through the corresponding hole in the first lamination, and is bent against the side of the first lamination that is opposite to the side adjacent to the stack to secure the stack together.

Another aspect of the present invention is a laminated plate assembly that comprises a first lamination and a second lamination positioned adjacent to the first lamination. At least one interlocking tab extends beyond the periphery of the second lamination. This tab is wrapped around the periphery of the first lamination and is crimped against the side of the first lamination that is opposite to the side adjacent to the stack to secure the stack together.

Yet another aspect of the present invention is a method of securing adjacent laminations in a stack, wherein at least one hole is formed in each lamination in the stack, corresponding in number and position thereof with the hole(s) of each other lamination in the stack. The material is removed from the hole(s) of each lamination in the stack except the top lamination. The material from the hole in the top lamination in the stack forms an interlocking tab that projects through the corresponding hole in each other lamination in the stack. Each tab is bent against the side of the bottom lamination that is opposite to the side adjacent to the stack, securing the laminations in the stack together.

Another aspect of the present invention is method of securing adjacent laminations in a stack together, wherein at least one interlocking tab is formed in the top lamination in the stack that projects beyond the periphery of the top lamination. Each tab is wrapped around the periphery of each lamination in the stack and is crimped against the side of the bottom lamination in the stack that is opposite to the side adjacent to the stack, securing the laminations of the stack together.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION

Figure 1:
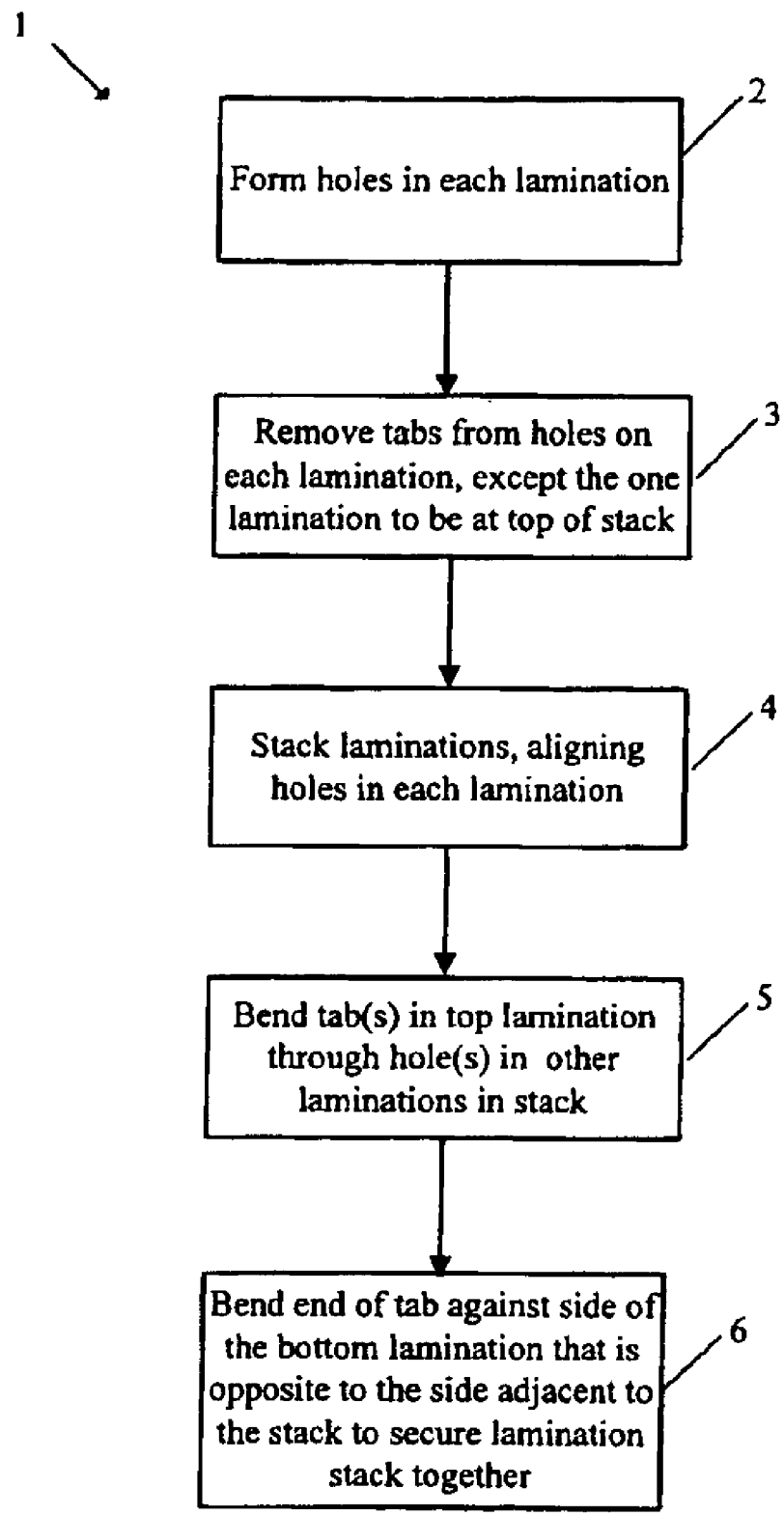
FIG. 1 is a flow chart showing a method of assembling and interlocking laminations in a stack.

In the discussion of the FIGURES, the same reference numerals will be used throughout to refer to the same or similar components. In the interest of conciseness, various other components known to the art, such as dies, punches, and the like necessary for the manufacture of laminations, have not been shown or discussed. Even though numerous characteristics and advantages of the present invention have been described in the drawings and accompanying text, the description is illustrative only, and changes may be made, especially in matters of arrangement, shape and size of the parts, within the principles of the invention to the full extent indicated by the broad general meaning of the terms used in the claims. The words "top," "uppermost," "bottom," and "lowermost," as used in this document, are used in reference to a stack of laminations as it would appear when it is placed on a horizontal surface and the lamination to which an interlock tab is attached is at the "top," or furthest away from the horizontal surface, and the lamination to which the interlock tab is crimped is at the "bottom" or closest to the horizontal surface.

FIG. 1 depicts a method of assembling and interlocking laminations in a stack 1. Each step in the method is described further below.

Figure 2:
FIG. 2 is perspective bottom view of a lamination blank.

FIG. 2 depicts a blank 10 used to create a lamination in the stack as described below and depicted in FIGS. 3 through 6.

Figure 3:
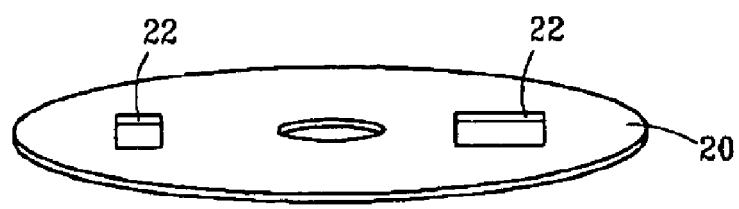
FIG. 3 is a perspective bottom view of a lamination in one of the embodiments of the present invention.

At step 2 in FIG. 1, holes are cut in each lamination to be used in the lamination stack. FIG. 3 depicts a first lamination 20 cut from a blank 10 to be used in an embodiment of a lamination stack. One or more holes 22 are cut out of each first lamination 20. The material (not shown) which was in these holes 22 before they were cut is removed from the first lamination 20, as described in step 3 of FIG. 1.

Figure 4:
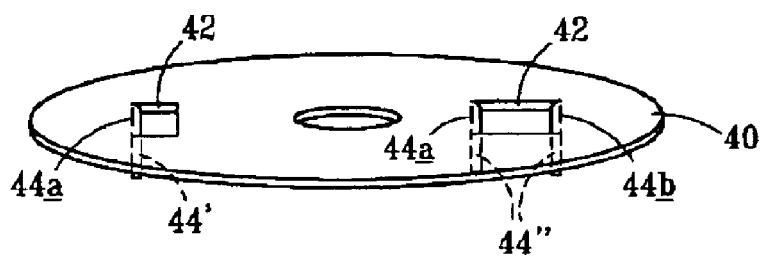
FIG. 4 is a perspective bottom view of the uppermost lamination in one of the embodiments of the present invention.

FIG. 4 depicts a second lamination 40 cut from a blank 10 to be used in an embodiment of a lamination stack, as described in step 2 of FIG. 1. One or more holes 42 are cut out of the second lamination 40 that are of a corresponding size and in a corresponding location as the holes 22 in the first lamination 20. As described further below, the material which was in these holes 42 in the second lamination 40 forms an interlock tab 44 that remains secured to the second lamination 40 on at least one side 44a of the hole 42. In this depiction, the interlock tab 44' in one hole 42 remains attached to the lamination 40 on one side 44a. The interlock tab 44' in another hole 42 remains attached to the lamination 40 on two sides, 44a and 44b.

Figure 5:
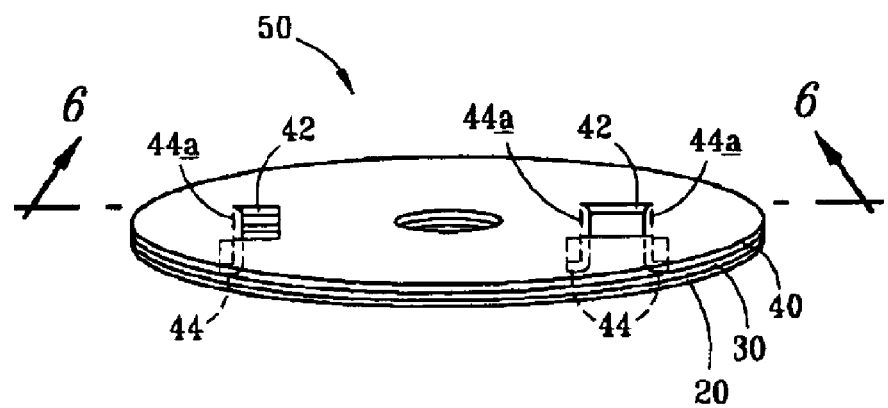
FIG. 5 is a perspective view of a stack of typical laminations secured together with interlock tabs in one of the embodiments of the present invention.

The laminations are stacked together at step 4 in FIG. 1. Referring to FIG. 5 of the drawings, the reference numeral 50 generally designates a stack of laminations embodying features of one embodiment of the present invention. The lamination stack 50 includes a first lamination 20 and a second lamination 40. Optionally, one or more interior laminations 30 (only one of which is shown) are interposed between the first lamination 20 and the second lamination 40. If the embodiment of the invention includes any interior laminations 30, one or more holes 32 are cut out of the lamination 30 that are of a corresponding size and in a corresponding location as the holes 22 in the first lamination 20. The material (not shown) which was in the holes 32 before they were cut is removed from the interior lamination 30. The interlock tab 44 is bent at securing point 44a, 44b in such a manner that it protrudes through the corresponding hole 32 in any interior laminations 30, and through the corresponding hole 22 in the first lamination 20. This process is described at step 5 in FIG. 1. The interlock tab 44 is then bent against the side of the first lamination 20 that faces away from the stack 50, thereby interlocking all the laminations in the stack 50 together, much as a staple secures papers in a stack together. This process is described in step 6 of FIG. 1.

Figure 6:
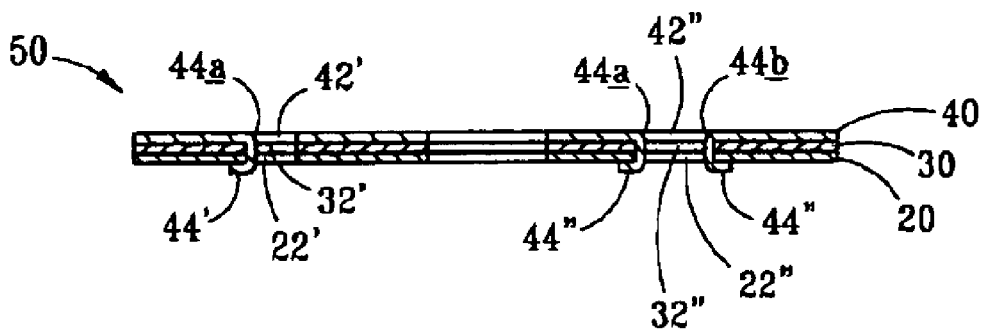
FIG. 6 is a cross-sectional view of the lamination stack of FIG. 5 taken along the line 6—6 of FIG. 5, showing the interlock tabs securing the laminations in the stack together.

In FIG. 6, a cross-section of the lamination stack 50 is shown. In the example shown, it can be clearly seen that holes 22', 22", 32', 32", have been cut from the first lamination 20 and the interior lamination 30, and the material (not shown) has been removed. Holes 42', 42", have been cut out of the second lamination 40 that are of a corresponding size and in a corresponding location as the holes 22', 22" in the first lamination 20, and 32', 32" in the interior lamination 30.

The material which was in the holes 42', 42" in the second lamination 40 forms interlock tabs 44. The material from hole 42' remains secured to the second lamination 40 on one side 44a, forming a single interlock tab 44'. The material from hole 42" remains attached to the lamination on two sides, 44a, 44b, forming two interlock tabs 44". The interlock tabs 44', 44" are bent at the attached side(s) 44a, 44b in such a manner that they will protrude through the corresponding holes 32', 32" any interior laminations 30, and through corresponding holes 22', 22" in the first lamination 20 in the stack 10. That portion of each interlock tab 44 that extends below the first lamination 20 in the stack 10 is bent against the underside of the first lamination 20 in the stack 10 like a staple, thereby interlocking all the laminations in the stack together.

Figure 7:
FIG. 7 is a perspective bottom view of a lamination blank.

FIG. 7 depicts a blank 100 used to create a lamination in the stack as described further below and depicted in FIGS. 8 through 11.

Figure 8:
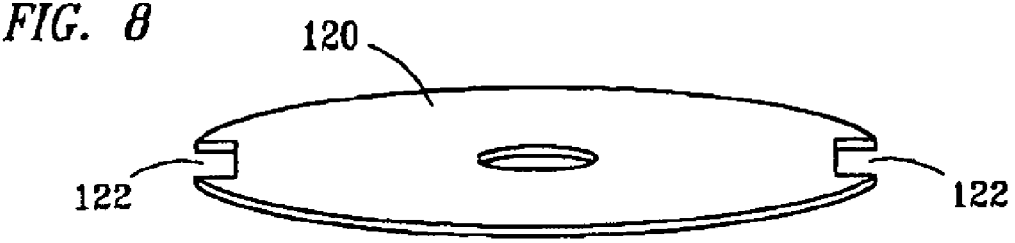
FIG. 8 is a perspective bottom view of one of the laminations in an alternative embodiment of the present invention.

At step 2 in FIG. 1, holes are cut in each lamination to be used in the lamination stack. FIG. 8 depicts a first lamination 120 cut from a blank 100 to be used in this embodiment of a lamination stack. The hole 122 can be clearly seen at the periphery of the first lamination 120 with material (not shown) that had filled the hole removed from the first lamination 120, as described in step 3 of FIG. 1.

Figure 9:
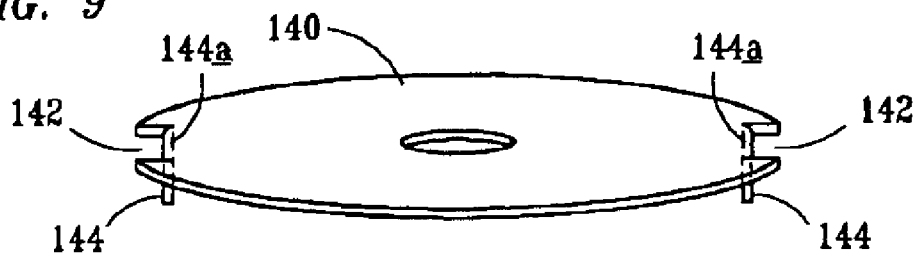
FIG. 9 is a perspective bottom view of the uppermost lamination in an alternative embodiment of the present invention.

FIG. 9 depicts a second lamination 140 cut from a blank 100 to be used in this embodiment of a lamination stack as described in step 2 of FIG. 1. One or more holes 142 are cut out of the periphery of the lamination 140 in a corresponding location as any holes 122 in the first lamination 120. The material which was in these holes 142 in the second lamination 140 forms an interlock tab 144 that remains secured to the second lamination 140 on at least one side 144a.

Figure 10:
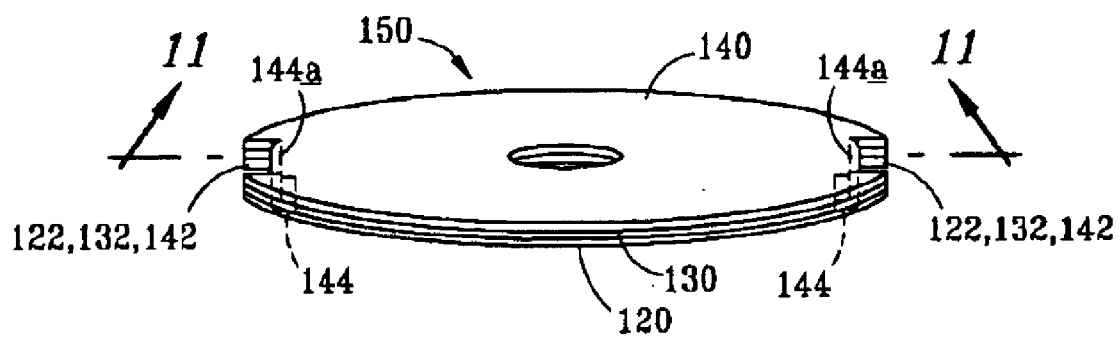
FIG. 10 is a perspective view of an alternative embodiment of a stack of typical laminations secured with interlock tabs.

The laminations are stacked together at step 4 in FIG. 1. FIG. 10 depicts this embodiment of the stack of laminations 150 of the present invention. The lamination stack 150 includes a first lamination 120 and a second lamination 140. Optionally, one or more interior laminations 130 (only one of which is shown) are interposed between the first lamination 120 and the second lamination 140. If the embodiment of the invention includes any interior laminations 130, one or more holes 132 are cut out of the lamination 130 that are of a corresponding size and in a corresponding location as the holes 122 in the first lamination 120. The material (not shown) which was in the holes 132 before they were cut is removed from the interior lamination 130. In this embodiment, the holes 122, 132, and 142 through the first lamination 120, any interior laminations 130, and the second lamination 140 are cut at the periphery of each lamination. The interlock tab 144 is bent at the securing point 144a in such a manner that it protrudes through the hole 142 in the second lamination, the corresponding hole 132 in any interior laminations 130, and the corresponding hole 122 in the first lamination 120. This process is described at step 5 in FIG. 1. The interlock tab 144 is then bent against the side of the first lamination 120 that faces away from the stack 150, like a staple, thereby interlocking all the laminations in the stack 150 together. This process is described in step 6 of FIG. 1.

Figure 11:
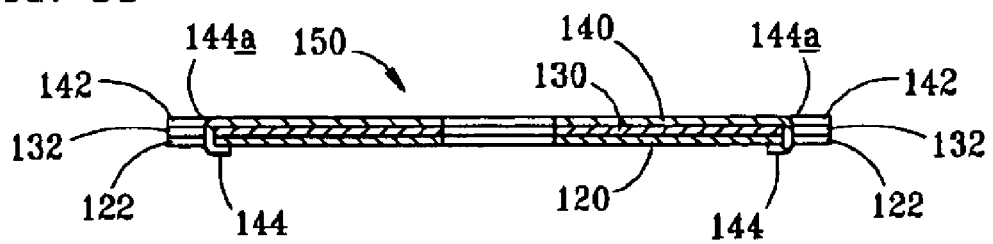
FIG. 11 is a cross-sectional view of the lamination stack of FIG. 10 taken along the line 11—11 of FIG. 10, showing the interlock tabs securing the laminations in the stack together.

In FIG. 11, a lamination stack 150 of the embodiment of the present invention shown in FIG. 10 is shown in a cross-sectional view. In this embodiment, it can be clearly seen that the first lamination 120 and, in this case the interior lamination 130, have holes 122, 132, on the periphery of the laminations, from which the material (not shown) has been removed. Holes 142 are cut in the second lamination 140 that are of a corresponding size and in a corresponding location as the holes 122 in the first lamination 120, and holes 132 in the interior lamination 130.

The material which was in the holes 142 in the second lamination 140 form interlock tabs 144, which are secured to the second lamination 140 on at least one side 144a. The interlock tab 144 is bent at the attached side(s) 144a in such a manner that it fits into the corresponding holes 132 in any interior laminations 130, and through the corresponding hole 122 in the first lamination 120 in the stack 150. That portion of the interlock tab 144 that extends below the first lamination 120 in the stack 150 is bent against the underside of the first lamination 120 in the stack 150, thereby interlocking all the laminations in the stack together, like a staple securing papers in a stack together.

Figure 12:
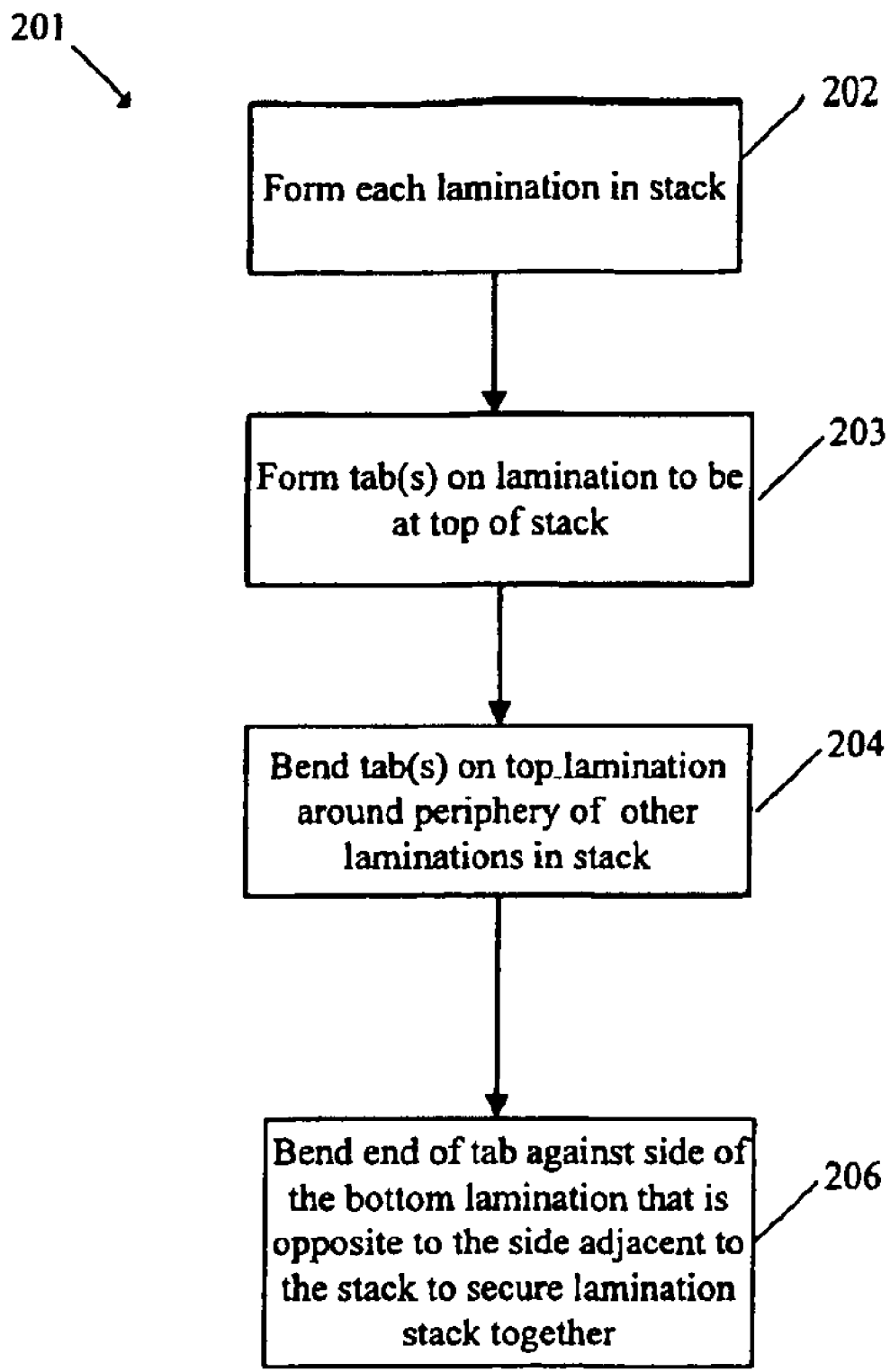
FIG. 12 is a flow chart showing a method of assembling and interlocking laminations in a stack.

FIG. 12 depicts a method of assembling and interlocking laminations in a stack 201. Each step in the method is described further below.

Figure 13:
FIG. 13 is a perspective bottom view of a lamination blank.

FIG. 13 depicts a blank 200 used to create a lamination in the stack as described further below and depicted in FIGS. 14 through 17.

Figure 14:
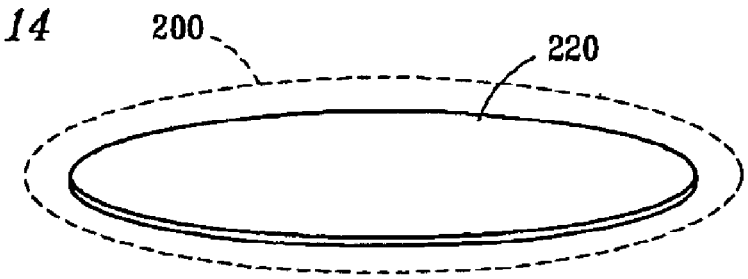
FIG. 14 is a perspective bottom view of one of the laminations in another alternative embodiment of the present invention.

FIG. 14 depicts a first lamination 220 from a blank 200 to be used in another alternative embodiment of a lamination stack. As can be clearly seen, there are no holes needed in the lamination 220 for securing the laminations of a stack 250 together.

Figure 15:
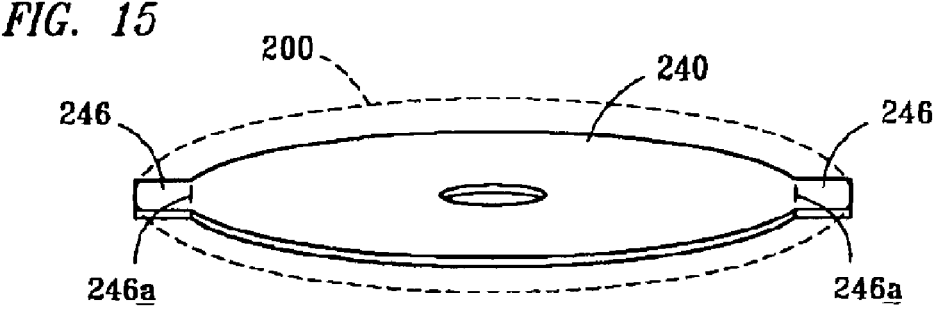
FIG. 15 is a perspective bottom view of the uppermost lamination in another alternative embodiment of the present invention.

FIG. 15 depicts a second lamination 240 from a blank 200 to be used in another alternative embodiment of a lamination stack 250. The second lamination 240 has one or more interlock tabs 246 that extend beyond the periphery of the second lamination 240 as described in step 203 of FIG. 12. These interlock tabs 246 are attached to the second lamination 240 on one side 246a.

Figure 16:
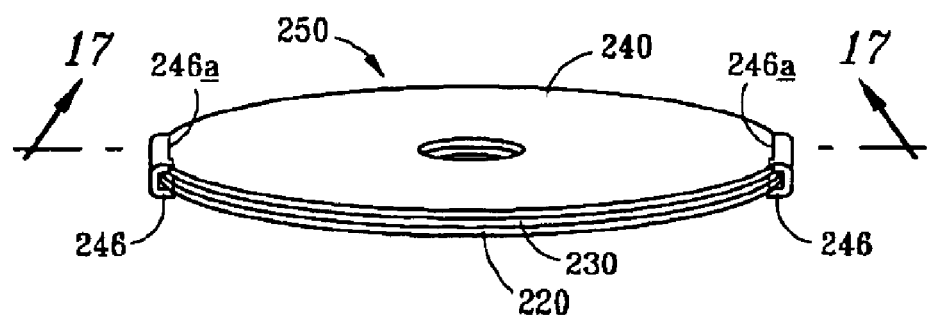
FIG. 16 is a perspective view of an another alternative embodiment of a stack of typical laminations secured with interlock tabs on the periphery of the laminations.

In FIG. 16, the stack of laminations 250 used in another alternative embodiment of the present invention is shown. The lamination stack 250 includes a first lamination 220 and a second lamination 240. Optionally, one or more interior laminations 230 (only one of which is shown) are interposed between the first lamination 220 and the second lamination 240. In this embodiment, the first lamination 220, and any interior laminations 230 have no holes. The second lamination 240 has an interlock tab 246 which extends beyond the periphery of the second lamination 240, and the interlock tab 246 is bent at the securing point 246a such that it goes around the periphery of any interior laminations 230 and the first lamination 220. This process is described at step 204 in FIG. 12. The interlock tab 246 is then bent against the side of the first lamination 220 that faces away from the stack 250 like a staple, thereby interlocking all the laminations in the stack 250 together. This process is described in step 206 of FIG. 12.

Figure 17:
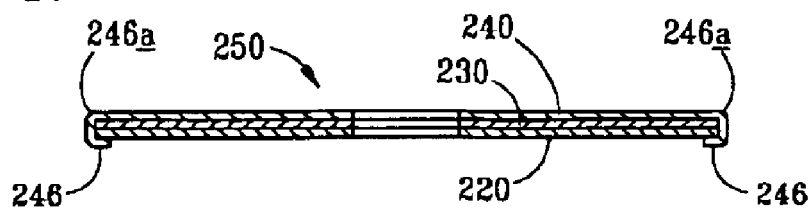
FIG. 17 is a cross-sectional view of the lamination stack of FIG. 16 taken along the line 17—17 of FIG. 16, showing the interlock tabs securing the laminations in the stack together.

In FIG. 17, a lamination stack 250 of another alternative embodiment of the present invention shown in FIG. 16 is shown in a cross-sectional view. It can be clearly seen that the there are no holes in the first lamination 220 or any interior laminations 230. Instead, the second lamination 240 has at least one interlock tab 246 that projects beyond the periphery of the second lamination 240 and is secured to the second lamination 240 on at least one side 246a. The interlock tab 246 is bent at the attached side 246a so that it is secured against the edges of all the laminations in the stack 250. That portion of the interlock tab 246 that extends below the first lamination 220 in the stack 250 is bent against the underside of the first lamination 220 in the stack 250, thereby securing all the laminations in the stack 250 together, like a staple securing papers in a stack together.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A laminated plate assembly comprising:
  a) a first lamination defining at least one hole;
  b) a second lamination positioned adjacent to the first lamination, the second lamination defining at least one hole corresponding in number and position thereof to the at least one hole of the first lamination; and
  c) at least one interlocking tab extending from each hole in the second lamination through the corresponding hole in the first lamination, the at least one tab being bent against a side of the first lamination that is opposite to a side adjacent to the second lamination, to thereby secure the first and second laminations together.

2. The assembly of claim 1 further comprising at least one interior lamination interposed between the first lamination and the second lamination, the interior lamination defining at least one hole corresponding in number and position thereof to the at least one hole of the first lamination.

3. The assembly of claim 1 wherein the at least one interlocking tab is at least one first interlocking tab and the assembly further comprises at least one second interlocking tab extending from at least one hole in the second lamination, and wherein each at least one first tab and each at least one second tab extend from a respective hole in the second lamination through a corresponding hole in the first lamination and are bent against the side of the first lamination that is opposite to the side adjacent to the second lamination, to thereby secure the first and second laminations together.

4. The assembly of claim 1 wherein the at least one hole in each of the first and second laminations is formed at the periphery of the lamination, the tab on the second lamination extends through the corresponding hole on the first lamination and is bent against a side of the first lamination that is opposite to the side adjacent to the second lamination, thereby securing the first and second laminations together.

5. A laminated assembly comprising:
   a) a plurality of laminations in a stacked formation, each lamination having first and second surfaces;
   b) the stacked formation including at least one first lamination and at least one second lamination;
   c) the at least one first lamination defining at least one hole;
   d) the second lamination defining at least one hole corresponding in number and position thereof to the at least one hole of the first lamination;
   e) at least one interlocking tab extending from each at least one hole in the second lamination remaining secured to the second lamination on at least one side of the hole;
   f) the at least one tab extending through the corresponding hole in the first lamination; and
   g) the at least one tab being bent against a side of the first lamination that is opposite to the side adjacent to the second lamination, thereby securing the first and second laminations together.

6. The assembly of claim 5 further comprising at least one interior lamination interposed between the first lamination and the second lamination, the interior lamination defining at least one hole corresponding in number and position to the at least one hole of the first lamination, wherein any material from the at least one hole is removed from the interior lamination.

7. The assembly of claim 5 wherein the at least one interlocking tab is at least one first interlocking tab and the assembly further comprises at least one second interlocking tab extending from at least one hole in the second lamination, each at least one first tab and each at least one second tab remaining secured to the second lamination on at least one side, each at least one first tab and each at least one second tab extending from the hole in the second lamination through the corresponding hole in the first lamination, each at least one first tab and at least one second tab being bent against the side of the first lamination that is opposite to the side adjacent to the second lamination, to thereby secure the first and second laminations together.

8. The assembly of claim 5 wherein the at least one hole in each of the first and second laminations is formed at the periphery of the laminations, and the tab on the top lamination extends through the corresponding slot of the first lamination, each tab being bent against the side of the first lamination that is opposite to the side adjacent to the second lamination, to thereby secure the first and second laminations together.

9. A laminated plate assembly comprising:
   a) a first lamination;
   b) a second lamination positioned adjacent to the first lamination, the second lamination having at least one interlocking tab projecting beyond the periphery of the second lamination; and
   c) wherein the at least one tab is wrapped around the periphery of the first lamination such that the tab is crimped against a side of the first lamination that is opposite to a side adjacent to the second lamination, to thereby secure the first and second laminations together.

10. The assembly of claim 9 further comprising at least one interior lamination interposed between the first lamination and the second lamination.

* * * * *